United States Patent [19]

Klaric

[11] Patent Number: 4,883,395
[45] Date of Patent: Nov. 28, 1989

[54] CONNECTING DEVICES FOR STRUCTURAL ELEMENTS

[75] Inventor: Dinko Klaric, South Melbourne, Australia

[73] Assignee: Space Display Systems Pty. Ltd., South Melbourne, Australia

[21] Appl. No.: 139,202

[22] Filed: Dec. 29, 1987

[30] Foreign Application Priority Data

Jan. 16, 1987 [AU] Australia ............... PH9909

[51] Int. Cl.⁴ ............................. F16B 13/06
[52] U.S. Cl. ........................ 411/55; 411/60
[58] Field of Search .............. 411/32, 33, 55, 57, 411/60, 72, 73

[56] References Cited

U.S. PATENT DOCUMENTS

| | | | |
|---|---|---|---|
| 2,139,167 | 12/1938 | Marshall | 411/55 |
| 2,309,122 | 1/1943 | Keenan, Jr. | 411/55 |
| 3,283,640 | 11/1966 | Ono | 411/33 |
| 4,611,485 | 9/1986 | Leslie | 411/55 |
| 4,640,654 | 2/1987 | Fischer et al. | 411/55 |

*Primary Examiner*—Neill R. Wilson
*Attorney, Agent, or Firm*—Mason, Fenwick & Lawrence

[57] ABSTRACT

A connecting device for structured elements with an improved force fit connection, of the type comprising a bolt with a floating nut and a sleeve portion near the head. The sleeve portion is adapted to be force fitted into a first structural member, is outwardly deformable and has a plurality of circumferential ribs. The bolt widens towards the sleeve end, so that when the threaded end is rotated by means of the floating nut into a second structural member, the sleeve is expanded inside the first member and enhances the force fit connection.

4 Claims, 3 Drawing Sheets

CONNECTING DEVICES FOR STRUCTURAL ELEMENTS

The present invention relates to connecting devices for use in connecting structural elements, for example, elements of space display systems.

Various forms of such connecting elements are known in the prior art. Australian Letters Patent No. 472753 by Hedley Lawrence discloses a connector for tubular members, having a bolt-type mechanism. This mechanism has the disadvantage of requiring rotation of the structural members themselves in order to tighten the connection and it requires the provision of a special portion in one member for insertion of the bolt.

Australian Patent Specification No. AU-B-38555/78 by Mero-Raumstruktur GmbH & Co. Wurzburg discloses a different bolt connector for tubular members. This connector can be tightened without rotation of the tubular members to be connected, but requires that the end of one tubular member to be connected have a connection part welded therein.

The necessity in these disclosures for a separate part to be joined to both members gives rise to extra expense and complication in their manufacture. The need to either insert the bolt during manufacture, or else weld a connection when the members are to be connected is inconvenient, time consuming and wasteful of resources.

One way of overcoming this drawback is disclosed in PCT/AU80/0019 by the Applicant. This specification discloses a connector which is force fitted into one member, thereby removing the need for a welded connection at one end. However, this connector suffers from a tendency to inadvertently disconnect at the force fitted end when subjected to mechanical or thermal stress.

Various disclosures in the prior art show means for clamping tubular members together. Australian Specification No. AU-A-29209/84 is exemplary of these techniques, which rely on an external wedge action to connect tubular members. Such external means are not desirable where connection members for space display systems are involved, as they are not visually pleasing and mar the exterior of the members to be connected. They do not leave a smooth, uninterrupted surface on the space display system.

It is an object of the present invention to provide a connector which is force fitted into one of the members to be joined and which force fitting is not readily dislodged, yet which remains unobstrusive once in use and simple to operate.

Another object of the present invention is to provide an improved connector of the type disclosed in the Applicant's PCT/AU80/0019 specification, but which has superior resistance to mechanical and thermal stresses.

A further object is to provide a space display system which is easily and quickly erected yet secure and aesthetically pleasing.

The present invention utilises a deformable sleeve member and a bolt with a widening near the head end, which in use upon sufficient rotation interact to expand the end of the sleeve inside one of the structural elements which are to be connected, thereby enhancing the connection at the force fitted end.

The connecting device for structural elements according to the present invention comprises:

a bolt, having a threaded end and a head end;

an axially floating nut provided thereon; and a sleeve between said floating nut and the head end of said bolt, said sleeve being adapted to be force fitted into a first structural element;

wherein said bolt increases in thickness towards the head end and said sleeve is outwardly deformable;

such that in use, the connecting device is force fitted into the first structural element, the threaded end of said bolt is rotatably engaged with a threaded opening in a second structural element, and upon sufficient rotation of the bolt the head end of said bolt engages the sleeve and deforms it outwardly inside the first structural element.

It will be understood that the part of the sleeve which is deformable may be constructed of a material which is inherently deformable or, alternatively, may be physically so constructed as to facilitate deformation. Examples of the latter include the provision of one or more slots, mere cutting of the sleeve so that it can be deformed, or other techniques well known for producing deformable structures.

While the invention is exemplified with respect to force fitting into a structural element with an internally circular cross-section, the invention is equally applicable to elements with other internal cross-sections, with appropriate modifications which would be apparent to one skilled in the art. Similarly, the cross-section of the sleeve need not be the same as the internal cross-section of the structural element. According to the instant invention, it need only be shaped so as to expand within and contact the inside wall of the structural element.

It also detracts in no way from the instant invention if the widening near the head of the bolt has a different cross-section to the portion of the sleeve which is deformable. It is only necessary that the bolt be capable of expanding the sleeve in such a way as to contact the inside wall of the structural member and enhance the force fit.

It will also be understood that the external shape and dimensions of the structural elements to be connected are irrelevant so long as they are consistent with enabling operation of the connecting device according to the present invention.

Preferably, the sleeve is longitudinally slotted over a major part of its length so as to facilitate expansion, and more preferably there are one or more circumferential ribs provided with one such rib being disposed at or near the head end of the bolt.

Preferably also, the floating nut has an inner surface matching the outer surface of the shank of the bolt in the region of the shank proximate the threaded end. More preferably, said shank region includes a plurality of circumferentially spaced, longitudinally extending ribs, and said inner nut surface includes a plurality of circumferentially spaced, longitudinally expanding channels for accomodating said ribs, the arrangement then being such that rotation of the floating nut may only be effected with an accompanying rotation of the shank and hence the bolt as a whole.

In order that the invention may be more fully described and/or understood, regard is now to be had to an embodiment of the invention with reference to the accompanying drawings in which.

Figure 1:
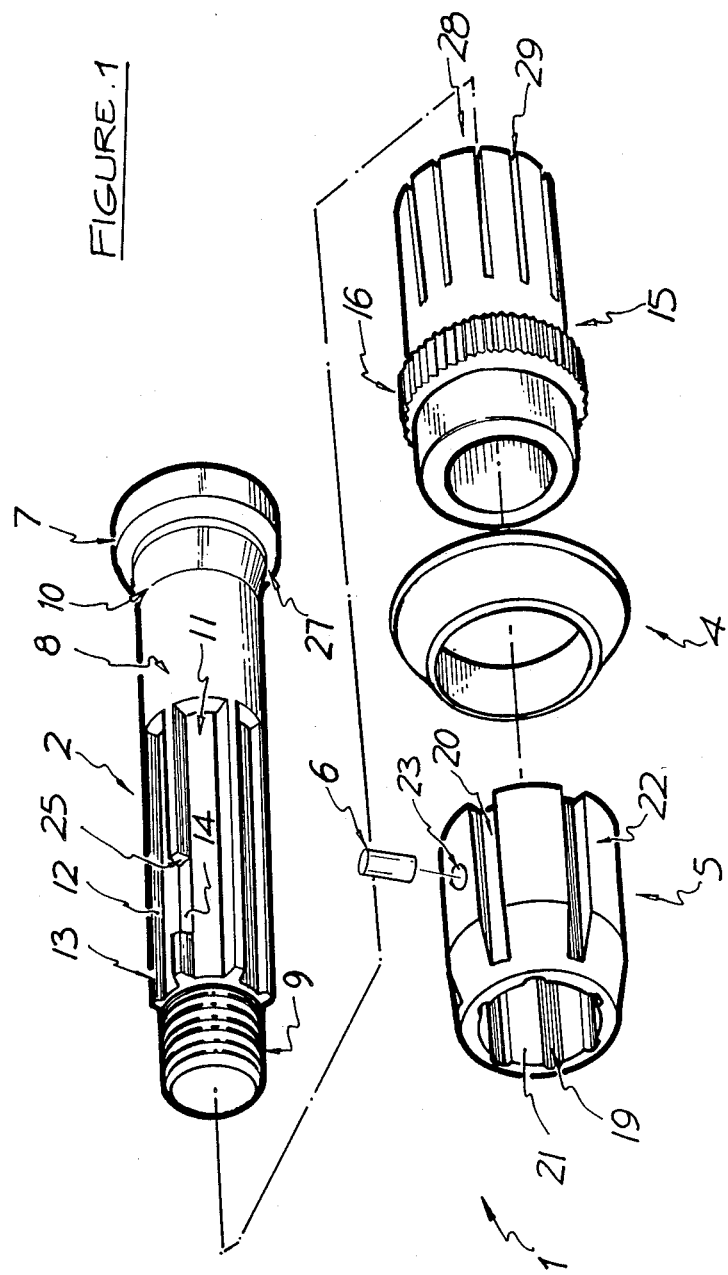
FIG. 1 is an exploded view illustrating the various components of the connecting device.

Referring to FIG. 1, the connecting device—generally designated as 1—consists of a bolt 2, sleeve 28, washer 4, floating nut 5 and pin 6.

The bolt 2 is characterised by a head 7, shank 8 and threaded end 9. The shank 8, at the head end, has an inclined ramp surface 10 with the larger dimension at the end nearest the head 7. The shank 8 also comprises a plurality of circumferentially spaced, longitudinally extending channels 11 with diverging sides 12, these channels thereby defining therebetween a plurality of tapered ribs 13 and being situated immediately 'upstream' of the threaded end 9. One of the ribs 13 is itself slotted at 14.

The sleeve 28 consists of a main cylindrical body 15, a knurled section 16 and a plurality of longitudinally extending slots 29.

The floating nut 5 is characterised by longitudinally extending channels 19, 20 in both the internal and external surfaces 21, 22 respectively. A small hole 23 also extends through the nut between surfaces 21, 22 midway between a pair of adjacent channels 20. The pin 6 is dimensioned to fit neatly through the hole 23, with the inner end 24 adapted to come to rest in the bolt slot 14 when the device is assembled.

To connect together the structural elements using the device is a fairly simple procedure involving, first of all, assembly of the device, and then fixing thereof to the respective elements.

More particularly, the sleeve 28, washer 4 and nut 5 are threaded on to the bolt in that order with the ends of the first three elements arranged as illustrated in FIG. 1 and, moreover, with the hole 23 in alignment with the slot 14 so that the pin 6 can be (and is) inserted into the hole 23. The pin 6 thus renders the nut 5 captive on the shank 8 to the extent of the travel of the pin end 24 between the ends 25 of the slot 14. The device is assembled thus.

Figure 3:
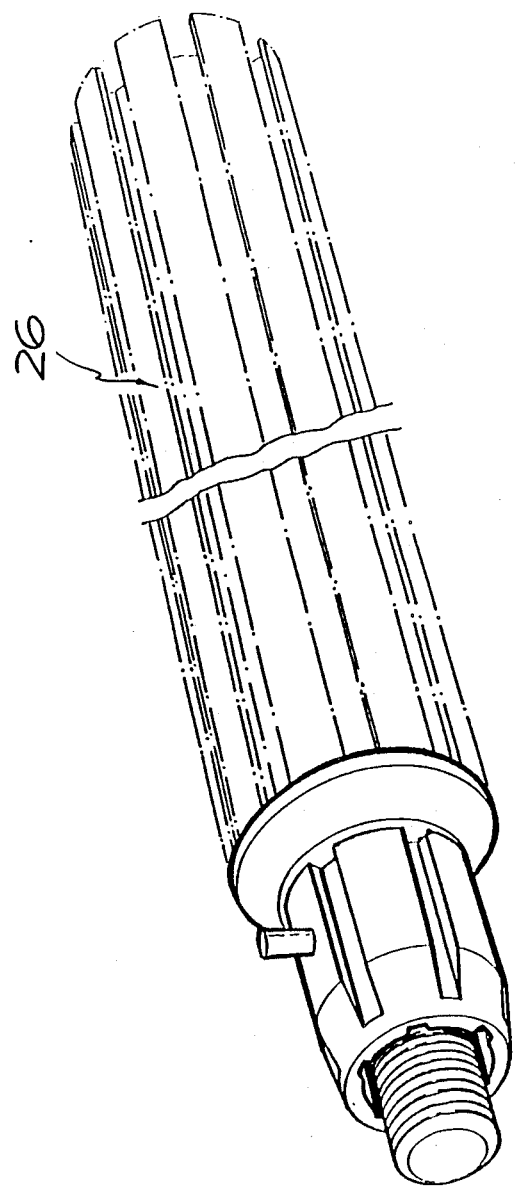
FIG. 3 is a perspective view illustrating the connecting device when force fitted into one of the structural elements.

One of the structural elements to be connected—in fact, that depicted in FIG. 3 as 26—has an axial bore into which the assembled device, and more particularly the sleeve 28, is force fitted. At this point, it is the knurled section 16 which provides the purchase or grip on the wall of the axial bore. This assures, of course, that no inadvertent rotation of the sleeve occurs. The head 7 of the bolt 2 is of a slightly smaller diameter than the sleeve ribs 17 so that the head and hence the bolt 2 as a whole is free to rotate in the bore of element 26.

The other structural element (not shown), in contrast to element 26, has a threaded aperture to receive the bolt thread 9. With the aid of a spanner or like tool, the bolt is screwed into said other element, utilizing the floating nut 5 as the means of purchase for the turning tool.

Once the thread 9 is inserted to a normally tight state, the nut 5 may be rotated even further and the effect of this is to deform the sleeve 28 as it rides up the ramp 10, finally coming to a halt as it abuts the underside 27 of the head 7. The deformation assumes the form of a flaring out of the sleeve 28, permissible because of the plurality of slots 29. This enhances the force fit relationship of the device within element 26. It therefore becomes considerably more difficult for inadvertent disconnection of the element 26 from the device to take place.

Figure 2:
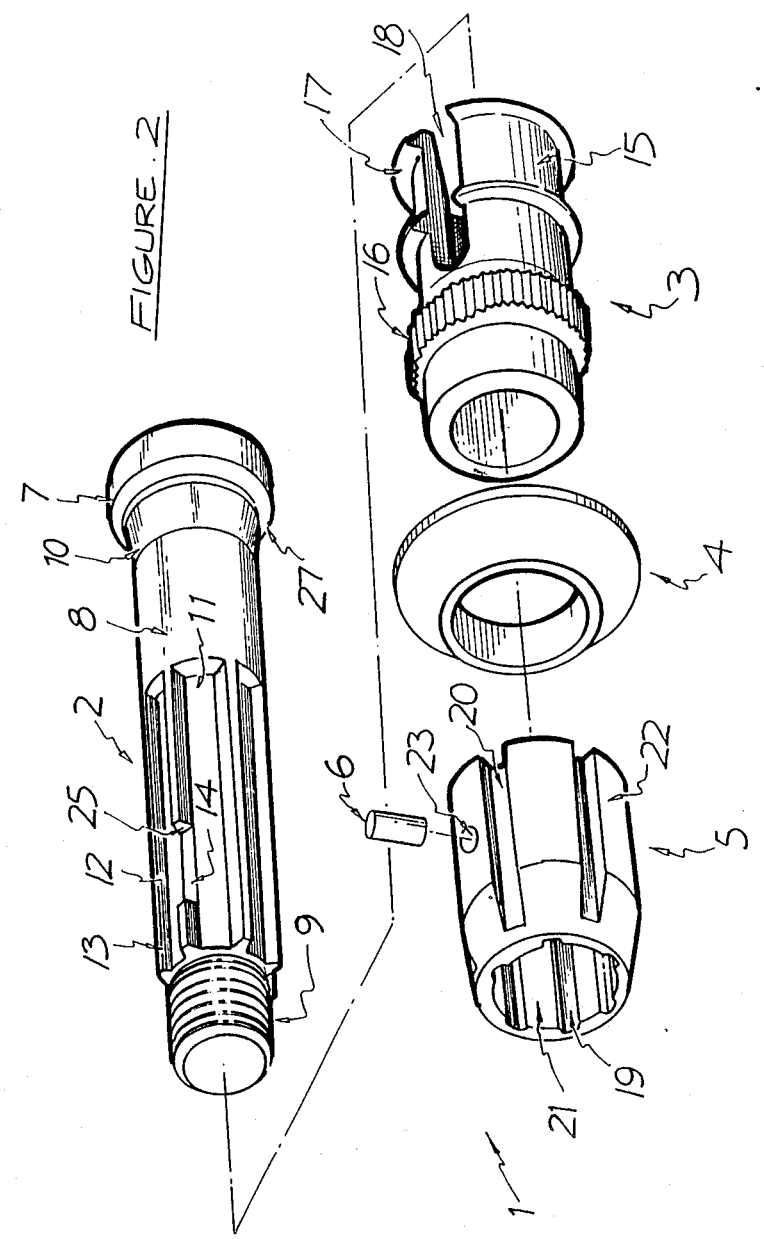
FIG. 2 is an exploded view of a preferred embodiment of the invention.

FIG. 2 illustrates a preferred embodiment of the invention. The connecting device is the same as previously described except for the provision of a sleeve 3 provided with two longitudinal slots 18 and a pair of circumferential but interrupted ribs 17. When the connecting device is assembled and tightened as previously described, not only the sleeve proper but also the longitudinal ribs 17 are deformed outwardly inside the element 26. The ribs produce even greater enhancement of the force fit, as they are adapted to bite into the axial bore of element 26. The sleeve also need not be deformed so far to produce an enhanced force fit, as the ribs 17 extend further radially outwards than the main body of the sleeve 15.

It is to be understood that variations and/or modifications may be made to the aforementioned disclosure and embodiments without in any way departing from the overall spirit and scope of the invention.

I claim:

1. A device for connecting two hollow tubular structural elements, a first one of said elements having a threaded opening and a second one of said elements having a cavity therein, comprising:
    a bolt having a threaded end adapted to cooperate with the threaded opening of the first structural element, and a head end, said bolt increasing in thickness toward said head end;
    a nut member disposed on said bolt and rotationally keyed so as to be adapted to rotate said bolt and to axially float on said bolt; and
    a sleeve disposed between said nut member and said head end of said bolt, said sleeve being adapted to be force fitted into the cavity of the second structural element, said sleeve being at least partially deformable;
    whereby upon sufficient rotation of said bolt in the threaded opening, said bolt contacts inwardly and expands at least a part of said sleeve outwardly to enhance the force fitting of said sleeve in the cavity.

2. A device according to claim 1, wherein said sleeve is deformable by at least one slot in the end of said sleeve adjacent said head end of said bolt.

3. A device according to claim 2, wherein said sleeve is provided with outwardly projecting members.

4. A device according to claim 3, wherein said outwardly projecting members comprise ribs extending substantially perpendicularly to the axis of said bolt.

* * * * *

UNITED STATES PATENT AND TRADEMARK OFFICE
CERTIFICATE OF CORRECTION

PATENT NO. : 4,883,395
DATED : November 28, 1989
INVENTOR(S) : Dinko Klaric

It is certified that error appears in the above-identified patent and that said Letters Patent is hereby corrected as shown below:

On the cover page, delete "Assignee:

Space Display Systems Pty., Ltd., South Melbourne, Australia"

Signed and Sealed this

Third Day of December, 1991

Attest:

HARRY F. MANBECK, JR.

*Attesting Officer*   *Commissioner of Patents and Trademarks*